US008649385B2

(12) United States Patent
Cholas et al.

(10) Patent No.: US 8,649,385 B2
(45) Date of Patent: Feb. 11, 2014

(54) METHODS AND APPARATUS FOR USING TUNERS EFFICIENTLY FOR DELIVERING ONE OR MORE PROGRAMS

(75) Inventors: Chris Cholas, Frederick, CO (US); George Sarosi, Charlotte, NC (US); William Helms, Longmont, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 1723 days.

(21) Appl. No.: 11/754,714

(22) Filed: May 29, 2007

(65) Prior Publication Data

US 2010/0020794 A1    Jan. 28, 2010

(51) Int. Cl.
  *H04L 12/28*    (2006.01)
(52) U.S. Cl.
  USPC ............................................. 370/401; 725/59
(58) Field of Classification Search
  USPC .............. 370/285, 351, 401, 496; 725/39, 93, 725/100, 111, 115, 117, 119, 153, 140, 59, 725/147, 109
  See application file for complete search history.

(56) References Cited

U.S. PATENT DOCUMENTS

| 5,757,441 | A * | 5/1998 | Lee et al. ...................... 348/731 |
| 6,512,777 | B1 * | 1/2003 | Nakatsugawa ................ 370/456 |
| 2002/0129368 | A1 * | 9/2002 | Schlack et al. ................. 725/46 |
| 2003/0128302 | A1 * | 7/2003 | Potrebic et al. .............. 348/731 |
| 2003/0220072 | A1 * | 11/2003 | Coffin, III ................... 455/3.02 |
| 2004/0013121 | A1 * | 1/2004 | Higashigawa et al. ....... 370/400 |
| 2004/0177384 | A1 * | 9/2004 | Kahn ............................ 725/140 |
| 2004/0196906 | A1 * | 10/2004 | Gordon et al. ........... 375/240.12 |
| 2004/0268410 | A1 * | 12/2004 | Barton et al. ................ 725/119 |
| 2005/0108769 | A1 * | 5/2005 | Arnold et al. ................ 725/115 |
| 2005/0125420 | A1 * | 6/2005 | Wong et al. .................. 707/100 |
| 2005/0138669 | A1 * | 6/2005 | Baran ........................... 725/111 |
| 2005/0188058 | A1 * | 8/2005 | Inoue ........................... 709/219 |
| 2006/0090191 | A1 * | 4/2006 | Takagi ......................... 725/153 |
| 2006/0171392 | A1 * | 8/2006 | Jen et al. ...................... 370/392 |
| 2007/0182867 | A1 * | 8/2007 | Price et al. ................... 348/731 |
| 2008/0141310 | A1 * | 6/2008 | Kunkel ........................... 725/58 |
| 2008/0216119 | A1 * | 9/2008 | Pfeffer et al. .................. 725/40 |
| 2008/0216135 | A1 * | 9/2008 | Pfeffer et al. .................. 725/93 |
| 2008/0216136 | A1 * | 9/2008 | Pfeffer et al. ................ 725/100 |
| 2008/0256575 | A1 * | 10/2008 | Raju et al. ...................... 725/39 |
| 2008/0282312 | A1 * | 11/2008 | Blinnikka .................... 725/153 |
| 2009/0204992 | A1 * | 8/2009 | Boyce et al. ................... 725/40 |
| 2009/0222875 | A1 * | 9/2009 | Cheng et al. ................. 725/147 |
| 2010/0158479 | A1 * | 6/2010 | Craner ........................... 386/92 |

* cited by examiner

*Primary Examiner* — Marcus R Smith
*Assistant Examiner* — Ajay Cattungal
(74) *Attorney, Agent, or Firm* — Straub & Pokotylo; Michael P. Straub; Stephen T. Straub

(57) ABSTRACT

In response to user requests for content, content may be dynamically mapped to communications channels, e.g., QAM channels, used to communicate multiple programs during the same transmission time slot, e.g., through the use of multiplexed MPEG streams. A customer premise device, e.g., STB, uses a tuner tuned to the QAM channel to receive the communicated stream, recovers multiple programs communicated using the single communications channel, and records and/or displays the recovered programs. In this manner, more programs can be received and recorded than there are tuners in the customer premise device, e.g., STB. In some embodiments a content service provider control node processes user requests for content, maps requested programs to transport streams, communicates mapping decision information to a content distribution node, and communicates QAM tuning information to the user devices which can then receive and record multiple programs communicated via a single communications channel. In some embodiments a customer premise device utilizes program information to direct demultiplexed program channels to local or remote recorders (for storing) or decoders (for playback).

16 Claims, 7 Drawing Sheets

METHODS AND APPARATUS FOR USING TUNERS EFFICIENTLY FOR DELIVERING ONE OR MORE PROGRAMS

FIELD OF THE INVENTION

The present invention is directed to improved content delivery methods and apparatus and, more particularly, to video content delivery methods and apparatus which allow for one or more tuners to be used efficiently as part of receiving, recording and/or viewing multiple programs.

BACKGROUND

A typical set top box (STB) has a limited number of RF tuners in it, e.g., one or two such tuners. Each tuner allows the STB to tune to one communications channel, e.g., QAM channel at a time. Normally one program, e.g., TV program or movie, is recovered and displayed or recorded from each communications channel. Thus, in many known systems, a STB is designed to support recovery and recording and/or display of a number of programs up to the number of tuners in the STB. If a STB has only two RF tuners, then with existing implementations, it can typically only record two different program channels simultaneously, or record one program channel while e.g., while a user views another program channel.

STBs are increasingly being paired with recording devices and/or include data storage capability which can be used to record and playback programs at a later time.

As the number of television and other program channels continues to increase, customers are faced with the increasing potential that programs of interest to the customer will be broadcast during the same time slots, on the same or different program channels. Given that set top boxes frequently only include one or two tuners, customers are frequently presented with more programs, movies or other content of interest being broadcast in a given time slot than there are tuners in the customer's STB. This presents the customer with the dilemma of having to use multiple STBs and corresponding recording devices if the customer desires to record more programs during a given time period than there are tuners in the customer's individual STB.

From a content provider's perspective, in order to provide customers an opportunity to record or view content to the extent desired, the content provider may have to repeat a broadcast of one or more programs to provide multiple recording/viewing opportunities to allow customers adequate opportunity to view/record the communicated content. Such repeated transmissions can be an inefficient use of communications resources since the repeated transmission of one communication may preclude the communication of new content or another program since communications bandwidth is a limited resource.

While the need to retransmit content can be inefficient in the case of broadcast programs such as television programs, the inefficient use of communications bandwidth can be particularly costly in the case of content delivery in the case of on demand or premium content delivery. In such applications the number of communications channels available for on-demand content or premium events may be relatively limited and the need to repeatedly transmit a title or other program may result in foregoing revenue that could have been obtained by delivering additional content, e.g., on demand or on a premium channel.

In view of the above discussion, it should be appreciated that it would be desirable if the number of different programs which could be simultaneously received and recorded or viewed by a customer could be increased. Adding tuners to STBs may be one way of achieving this objective. However, the cost of adding additional tuners can be cost prohibitive given the price sensitivity many consumers exhibit with regard to consumer electronics. Furthermore, given the large number of STBs deployed by a cable company and/or other content provider such as satellite providers, the cost of adding one or more tuners to each of a large number of STBs can represent a significant investment which may or may not be justified by the increased efficiency and/or premium channel or pay per view revenues that may be made possible by the additional hardware.

It should also be appreciated that there is a need for improved methods and/or apparatus that can be used to allow a set top box or other device to receive multiple programs at the same time and then record or display the programs. It would be highly desirable if the number of programs which could be received during a given time period and then recorded or displayed could exceed the number of tuners in the device, e.g., STB or other receiver, at the customer's premises.

In addition to improved methods and/or apparatus for implementing customer premise devices, such as STBs and/or satellite receivers, it may be desirable if improved methods of communicating programs to the customer premise devices could be devised which could be used in conjunction with improved customer device methods to make more efficient use of limited communications resources available for content delivery. For instance, it would be desirable for a device, e.g., STB, to be able to identify and utilize resources, e.g., tuners, in an efficient manner. It would be desirable if, in some embodiments a device was able to identify and use remote resources, e.g., one or more tuners located in a physically remote STB or device, when local resources are not available.

SUMMARY

Various features of the present invention are directed to customer premise device methods and apparatus. Some exemplary methods and apparatus allow a customer premise device, e.g., a set top box, to receive and then record and/or display more programs than the customer premise device includes tuners. Still other features of the invention are directed to improved utilization of unused resources, e.g., "remote" devices, such as tuners or other components of STB's in other locations, in order to meet the user's needs for viewing and/or recording of programs, e.g., multiple programs at the same time. The methods and apparatus described herein can be used alone and/or in combination with one or more of the methods and/or apparatus described in U.S. patent application Ser. No. 11/681,774, titled "METHODS AND APPARATUS FOR IMPROVED CONTENT DELIVERY INCLUDING CONTENT DELIVERY STREAMS DYNAMICALLY POPULATED IN RESPONSE TO USER REQUESTS" which was filed on Mar. 3, 2007, and which is hereby expressly incorporated by reference.

At the customer's premises, a user device, e.g., STB or satellite receiver, can receive multiple programs during the same time period on a single communications channel, e.g., QAM channel, recover the communicated program information and record or display the content corresponding to the multiple programs. Assuming a single tuner can be used to recover N programs from a single QAM channel and the user's STB has M tuners, where M and N are positive integers, a single STB can be used to recover and record or playback M×N programs without the need for more than M tuners. Assuming, for example that 6 programs can be transmitted simultaneously using a single QAM channel, and that a STB included two tuners, the STB could be used to support recording of 12 programs transmitted during a given transmission period as compared to 2 in the case where the STB is limited to supporting one program per tuner.

In accordance with some features, efficient use of resources is accomplished by providing one or more sets of information, e.g., a table of available communications channels and associated program channels. Information relating a selected program and/or program channel to a destination device is also stored, e.g., in the table. When a new request for a program is received from a user, a main processor/resource manager can identify from the available, e.g., stored information, the desired program channel, and determine whether a tuner, beyond any tuner already in use, is required to be tuned to the communications channel, e.g., QAM communications channel, corresponding to the selected program channel. When a tuner is required to receive the communications channel determined to include a desired program channel an available tuner is selected. The selected tuner may be a local tuner or one of a plurality of different remote tuners which could be accessed over the home network. The selected program received via the program channel can then be sent to storage and/or one or more playback devices. The program, e.g., in the form of a stream of packets recovered from the signal passed by the tuner, can be communicated over the home network thereby allowing the tuner, recording and/or playback resources to be local or remote from one another.

The methods and apparatus of the present invention take advantage of a communications channel's ability to support a data rate that allows multiple programs to be delivered using the same communications channel during a program delivery period. For example, a single QAM communications channel may support the delivery of content corresponding to multiple program channels at the same time. Thus, a single QAM channel may deliver program content corresponding to, e.g., four or more programs or titles at the same time, e.g., by delivering the content corresponding to the different programs in a multiplexed content delivery stream. While in some previous systems the content corresponding to a single program corresponding to a communications channel, e.g., a QAM channel would be recorded or displayed, in accordance with the invention the content corresponding to multiple programs communicated using the same channel are recorded and/or displayed. Thus, the number of programs which can be recorded and/or displayed is not limited to the number of tuners since individual communications channels to which a tuner may be tuned can be used to provide data corresponding to multiple programs.

Content delivery streams are used to deliver content to users. A content delivery stream may include data corresponding to one or more programs. Different content delivery steams may be delivered using different communications channels, e.g., QAM channels. In accordance with the invention, a tuner can be controlled to tune to a particular communications channel and receive via that channel content corresponding to multiple program channels.

Some, but not necessarily all, embodiments include the mapping of programs to communications channels in response to user requests for program content, e.g., video on-demand requests and/or orders for premium content. This process may involve the construction, e.g., dynamic allocation of program content to a content delivery stream, e.g., MPEG-2 Transport stream, in response to user requests for program content and the delivery of the transport stream including content corresponding to multiple programs via a communications channel, e.g., a QAM communications channel.

Some embodiments of the present invention allow a tuner resource, e.g., a tuner in a STB, to supply multiple program streams. This can reduce the number of tuner resources deployed in a home as compared to system where each tuner is used to recover a single program or program channel at a time. Some embodiments of the present invention provide for systems, methods, and apparatus for determining whether a tuner resource is already tuned to a communications channel which provides a program or programs that a user wishes to view or record. If a tuner is already tuned to the communications channel which provides the desired program channel, an additional tuner resource need not be used; even if another program channel corresponding to the same communications channel is already being recovered from the signal passed by the tuner. If a tuner is not already tuned to the communications channel used to communicate the selected program, the present invention identifies and uses a local or remote tuner. Some embodiments allow packets corresponding to the selected programs to be directed to recording and/or playback devices, which may be local or remote from the tuner resource used to recover the program. The packets may be communicated, such as would be found in a home network.

A user with one tuner and one decoder can receive several program streams simultaneously via the one tuner, store the streams in a recorder, and then send individual programs from the recorder to a video decoder to sequentially view each of the simultaneously transmitted programs. Optionally, one or more of the program streams may be decoded and viewed instead of being recorded and/or viewed in addition to being recorded. In addition, remote tuners and/or decoders may be used when local resources are not available.

While various embodiments have been discussed in the summary above, it should be appreciated that not necessarily all embodiments include the same features and some of the features described above are not necessary but can be desirable in some embodiments. Various additional features, advantages, and/or embodiments of the present invention are discussed in the detailed description which follows.

DETAILED DESCRIPTION

Various exemplary methods and apparatus of the present invention will now be discussed and described with reference to the figures.

Figure 1A:
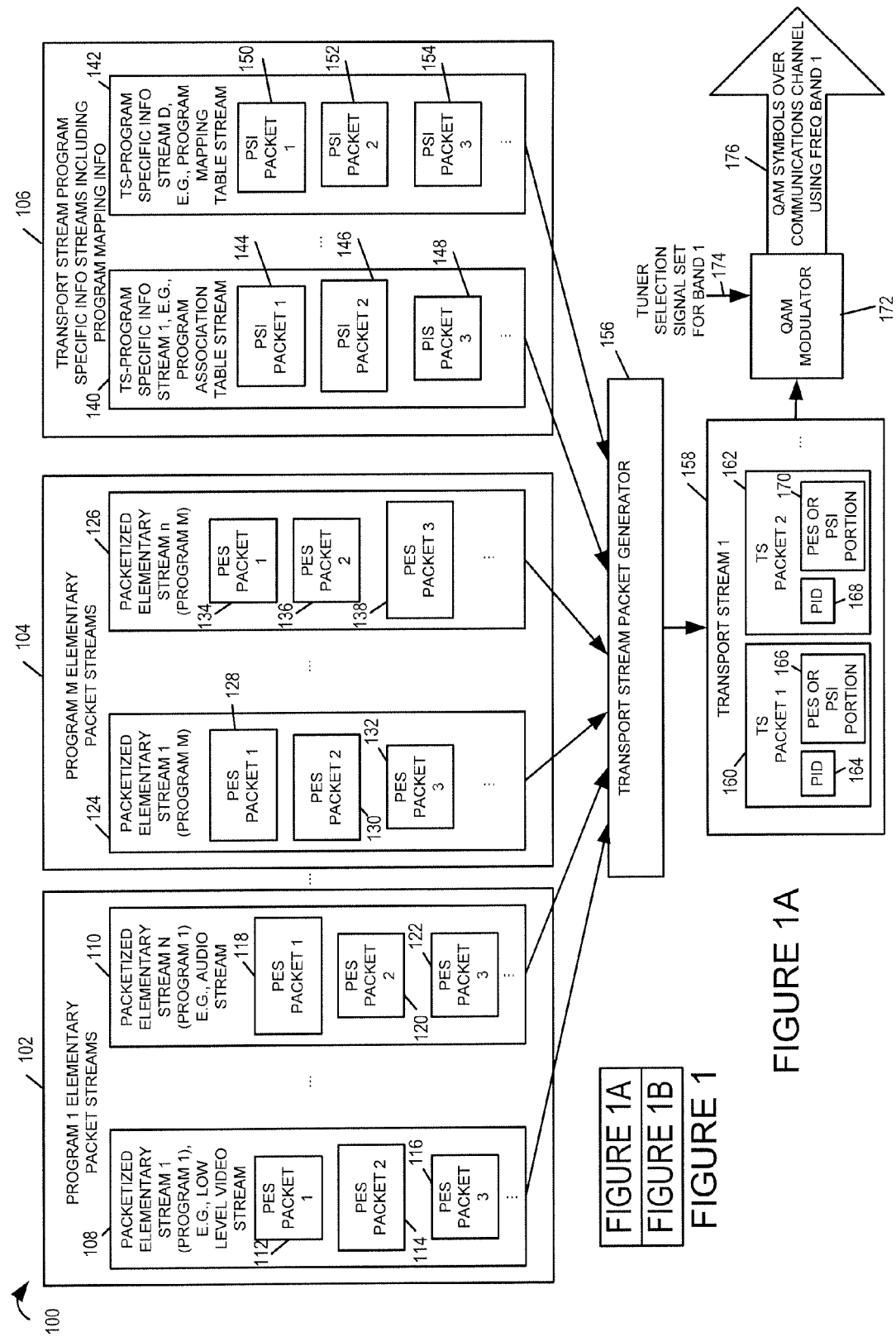
FIG. 1 comprising the combination of FIG. 1A
FIG. 1B is a drawing illustrating exemplary communication, recording and playing of program information in accordance with various embodiments of the present invention.
Figure 1B:
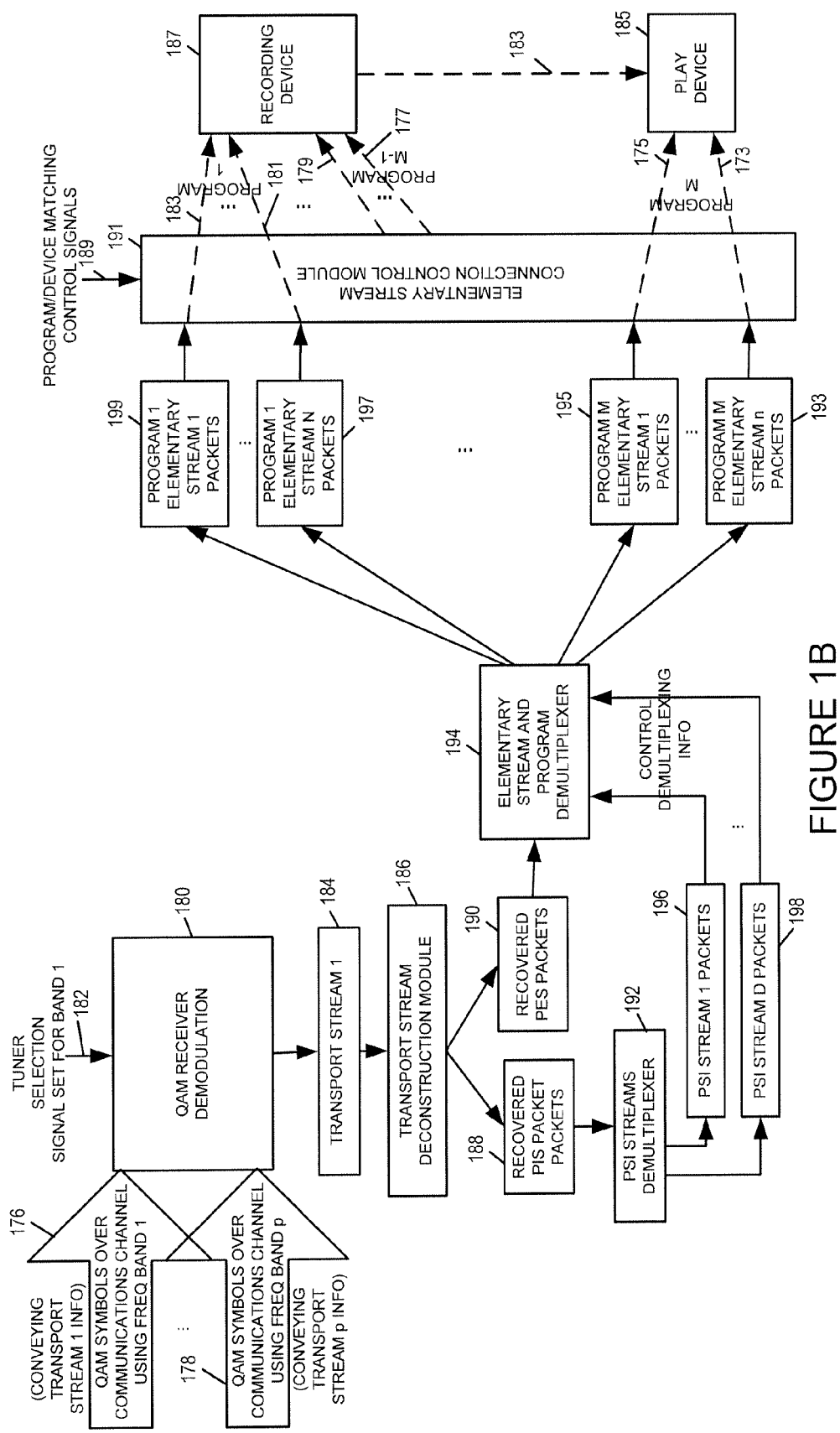

FIG. 1 comprising the combination of FIG. 1A and FIG. 1B is a drawing 100 illustrating exemplary communication, recording and playing of program information in accordance with various embodiments of the present invention. For each program to be communicated there are one or more elementary packet streams. Exemplary elementary streams corresponding to a program include, e.g., a low level video stream, an intermediate level video stream, a high level video stream and an audio stream. In FIG. 1 there are M exemplary programs to be communicated. Program 1 elementary packet streams information 102 includes a plurality of elementary packet streams (packetized elementary stream 1 108, . . . , packetized elementary stream N 110). Packetized elementary stream 1 108 includes a plurality of packetized elementary stream packets (PES packet 1 112, PES packet 2 114, PES packet 3 116, . . . ). Packetized elementary stream N 110 includes a plurality of packetized elementary stream packets (PES packet 1 118, PES packet 2 120, PES packet 3 122, . . . ). Program M elementary packet streams information 104 includes a plurality of elementary packet streams (packetized elementary stream 1 124, . . . , packetized elementary stream n 126). Packetized elementary stream 1 124 includes a plurality of packetized elementary stream packets (PES packet 1 128, PES packet 2 130, PES packet 3 132, . . . ). Packetized elementary stream n 126 includes a plurality of packetized elementary stream packets (PES packet 1 134, PES packet 2 136, PES packet 3 138, . . . ). PES packets can be, and sometimes are, of different size.

In addition to the elementary packets streams, there are also one or more transport stream program specific information streams including program mapping information to be communicated. Exemplary transport streams program specific information streams information 106 includes a TS program specific information stream 1 140, e.g., a program association table stream and TS program specific information stream D 142, e.g., a program mapping table stream. TS program specific information stream 1 140 includes a plurality of program information stream (PSI) packets (PSI packet 1 144, PSI packet 2 146, PSI packet 3 148, . . . ). TS program specific information stream D 142 includes a plurality of program information stream (PSI) packets (PSI packet 1 150, PSI packet 2 152, PSI packet 3 154, . . . ). PSI packets can be, and sometimes are, of different size.

Packets from the various program elementary streams (108, 110, 124, 126) and programs specific information streams (140, 142) are input to a transport stream packet generator module 156 which generates and outputs transport stream 1 158. Transport stream 1 158 includes a plurality of transport stream packets (TS packet 1 160, TS packet 2 162, . . . ). Each transport stream packet is of the same size. Each transport stream packet includes a packet identifier (PID) and a PES packet portion or a PSI packet portion. TS packet 1 160 includes PID 164 and PES or PSI packet portion 166. TS packet 2 162 includes PID 168 and PES or PSI packet portion 170.

Generated transport stream 1 158 is input to a QAM modulator 172. A tuner selection signal 174 for the QAM modulator is set for frequency band 1. The QAM modulator generates and outputs QAM symbols over a communications channel using frequency band 1, as represented by large arrow 176, the generated QAM symbols conveying the transport stream 1 158.

In FIG. 1B, QAM receiver demodulator 180, which is controllable, can receive information and process information corresponding to different transport streams, at different times. Large arrow 176, which is the output of FIG. 1A, represents QAM symbols over a communications channel using frequency band 1 conveying transport stream 1 information. Large arrow 178 represents QAM symbols over a communications channel using frequency band p conveying transport stream p information. QAM receiver demodulator 180 receives tuner selection signal 182, which at this time is set for band 1. QAM receiver demodulator receives and processes QAM symbols signals 176 and outputs transport stream 1 184. Transport stream 1 184 is input to transport stream deconstruction module 186 which recovers and outputs recovered PSI packets 188 and recovered PES packets 190. The recovered PSI packets are input to a PSI streams multiplexer 192 which recovers and outputs one or more PSI streams (PSI stream 1 packets 196, . . . , PSI stream D packets 198). Elementary stream and program demultiplexer module 194 receives recovered PES packets 190 and PSI stream 1 packets 196 and PSI stream D packets 198 as inputs. The packets of the PSI streams (196, . . . , 198) provide control demuxing information, which module 194 uses to map particular recovered packets PES packets back to a program elementary stream of a particular program. Elementary streams corresponding to the M programs are output from module 194. Corresponding to program 1, program 1 elementary stream 1 packets 199, . . . , program 1 elementary stream N packets 197 are recovered. Corresponding to program M, program M elementary stream 1 packets 195, . . . , program 1 elementary stream n packets 193 are recovered.

The various elementary streams ((199, . . . , 197), . . . , (195, . . . , 193)) are input to elementary stream connection control module 191. The elementary stream connection control module 191 can, and sometimes does, couple a set of elementary streams corresponding to a program to one or more of a recording device 187 and a play device 185. Program/device matching control signals 189, input to connection control module 191, are used by module 191 to control coupling selection. In this example, at this time, control signals 189 control programs 1 through program M-1 to be coupled to recording device 187, as indicated by arrows ((183, 181), (179, 177)) and program M to be coupled to play device 185, as indicated by arrows (175, 173). Thus, play device 185 can be playing program M at the same time that recording device 187 is recording program 1 through program M-1. Arrow 183 from recording device 187 to play device 185 indicates that a recorded program stored on recording device 187 may be accessed and played by play device 185.

At different times, different programs may be, and sometimes are, coupled to different devices. Sometimes, in some embodiments, some programs from the set of programs communicated in the transport stream which is recovered are coupled through module 191, which other programs from the set of programs communicated in the same transport stream are not coupled through module 191. In some embodiments, at some times, some of the elementary transport streams corresponding to a program are coupled and/or used by recording device 187 and/or play device 185, while other elementary streams corresponding to the same program are not coupled and/or used by the recording device and/or play device 185. In some such embodiments, control signals 189 also control selection of subsets of elementary streams. For example, a user's play device 185 may not have high definition capability; therefore, elementary streams used for high definition are not forwarded to recording device 187 and/or play device 185. As another example, high definition video is a premium service to which a particular user has not subscribed; and therefore elementary streams used for high definition are not forwarded to recording device 187 and/or play device 185.

In one exemplary embodiment, the transport stream packet generator 158 and QAM modulator 172 are part of a content distribution node. In some such embodiments, the tuner selection signal 174 is generated by a policy server node, e.g., a switched digital video (SDV) policy server node. In various embodiments, the QAM receiver demodulator 180, transport stream deconstruction module 186, PSI streams demultiplexer 192, elementary stream and program multiplexer 194 and elementary stream connection control module 191 are included as part of a set top box (STB). In various embodiments, the recording device 187 is a digital storage device, e.g., a DVR, at the customer premise corresponding to the STB, and the play device 185 is, e.g., a television set, at the customer premise corresponding to the STB.

Figure 2:
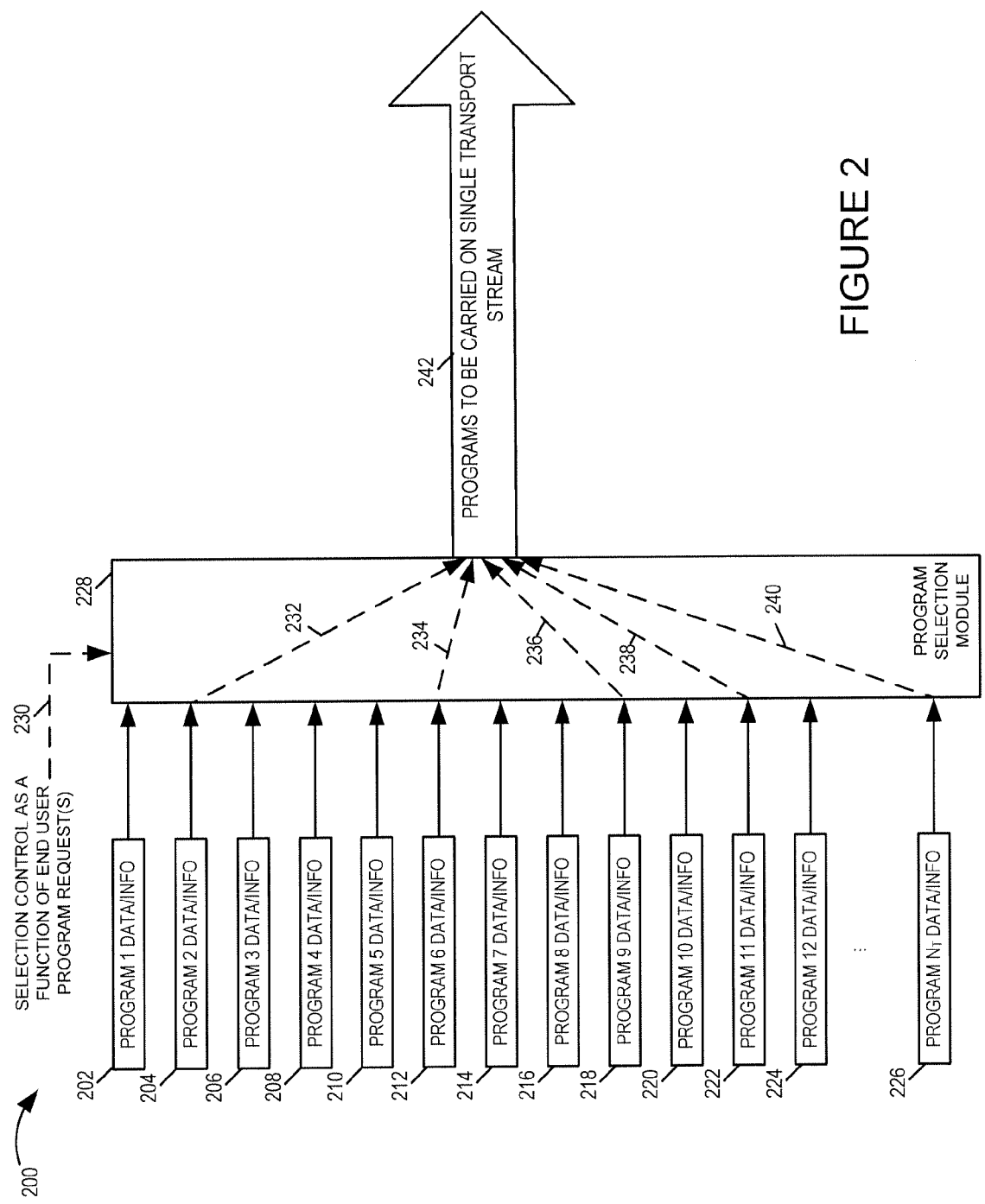
FIG. 2 illustrates a feature of various embodiments of the present invention, in which the selection of programs to be carried by a transport stream is a function of end user program selection.

FIG. 2 illustrates in drawing 200 a feature of various embodiments of the present invention, in which the selection of programs to be carried by a transport stream is a function of end user program selection. In the example of FIG. 2, there are $N_T$ available programs (program 1 data/information 202, program 2 data/information 204, program 3 data/information 206, program 4 data/information 208, program 5 data/information 210, program 6 data/information 212, program 7 data/information 214, program 8 data/information 216, program 9 data/information 218, program 10 data/information 220, program 11 data/information 222, program 12 data/information 224, . . . , program $N_T$ data/information 226. Each set of program data/information, e.g., program 2 data/information 204 includes one or more elementary packet streams, e.g., a low level video stream, an intermediate level video stream, a high level video stream, an audio stream, a first closed caption stream, a second closed caption stream, a foreign language audio stream, etc.

The program data/information (202, 204, 206, 208, 210, 212, 214, 216, 218, 220, 222, 224, . . . , 226) are available as inputs to program selection module 228. Selection control signals 230, which are a function of end user program request(s), are used by program selection module 228 to control population of a transport stream. At this particular time the selection control signal 230 indicates that programs (2, 6, 9, 11 and $N_T$) are to be carried by a single transport stream, and module 228 forwards the corresponding data/information as indicated by dashed line arrows (232, 234, 236, 238, 240). Large arrow 242 represents that a plurality of selected programs are being carried on a single transport stream, wherein at least some of the selected programs were selected in response to end user program requests. The transport stream packets corresponding to the plurality of selected programs are typically multiplexed in the transport stream.

Figure 3:
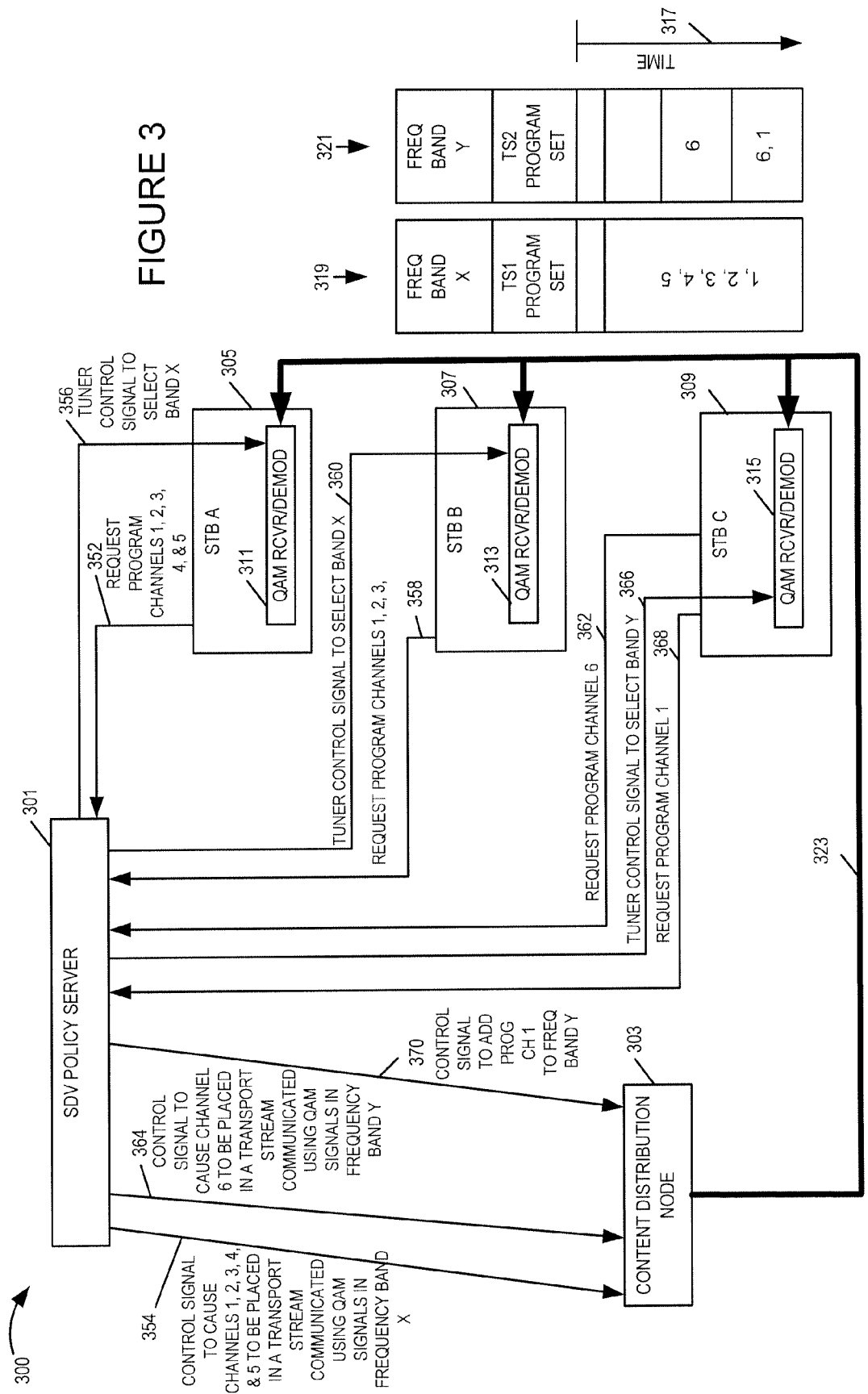
FIG. 3 is a drawing illustrating exemplary end user program selection, control signaling, transport stream construction, and content delivery in accordance with various embodiments of the present invention.

FIG. 3 is a drawing 300 illustrating exemplary end user program selection, control signaling, transport stream construction, and content delivery in accordance with various embodiments of the present invention.

In drawing 300 there is a content delivery system including an SDV policy server 301, a content distribution node 303, and a plurality of set top boxes (STB A 305, STB B 307, STB C 309). STB A 305 sends signal 352 to SDV policy server 301 to request program channels 1, 2, 3, 4 & 5. The SDV policy server 301 receives the request signal 352 and generates control signal 354, which it sends to content distribution node 303. Control signal 354 commands that channels 1, 2, 3, 4, & 5 be placed in a transport stream communicated using QAM signals in frequency band X. Content distribution node 303 implements the command. SDV policy server 301 sends tuner control signal 356 to STB A 305 notifying STB A 305 to set its QAM receiver/demodulator 311 to select band X.

Next, STB B 307 sends signal 358 to SDV policy server 301 to request program channels 1, 2, 3. The SDV policy server 301 receives the request signal 358, recognizes that the requested changes are already available on frequency band X and generates tuner control signal 360, which it sends to STB B 307. Tuner control signal 360 notifies STB B 307 to set its QAM receiver/demodulator 313 to select band X.

Next, STB C 309 sends signal 362 to SDV policy server 301 to request program channel 6. The SDV policy server 301 receives the request signal 362 and generates control signal 364, which it sends to content distribution node 303. In this example, a transport stream corresponding to a frequency band can carry up to 5 multiplexed program channels; therefore, the transport stream for frequency band X is currently full. Control signal 364 commands that channel 6 be placed in a transport stream communicated using QAM signals in frequency band Y. Content distribution mode 303 implements the command. SDV policy server 301 sends tuner control signal 366 to STB C 309 notifying STB C 309 to set its QAM receiver/demodulator 315 to select band Y.

Next, STC 309 sends signal 368 to SDV policy server 301, requesting program channel 1. SDV policy server 301 sends control signal 370 to content distribution node 303 commanding node 303 to add program channel 1 to frequency band Y. Content distribution node 303 implements the request.

Drawing 300 also includes information 319 identifying the programs being carried by transport stream 1 using frequency band X over time, and information 321 identifying the programs being carried by transport stream 1 using frequency band X over time. Information 319 and 321 identifies conveyed information in signals 323 being output from content distribution node 303 and which is available at the inputs to STBs (305, 307, 309). Time line 317 corresponds to information 319 and 321. Initially neither frequency band is carrying any user requested program channels. Then user requested programs channels 1, 2, 3, 4, and 5 are placed in transport stream 1 and communicated using QAM signals in frequency band X. At a later point in time, program channel 6 is placed into transport stream 2 and communicated using QAM signals in frequency band Y. At a still later point in time program channel 1 is also placed into transport stream 2 and communicated using QAM signals in frequency band Y. The program setting for frequency band X has remained for the duration of the example.

In various embodiments, multiple program channels may be received on each QAM communications channel, e.g., during the same program transmission time period. By utilizing the above described delivery of QAM channels (communications channels) with associated program channels to the premises, desired program channels extracted from the QAM channels, for example, can be distributed, e.g., simultaneously or during the same transmission period, to local or remote recording or playback devices as directed by a processor and/or resource manager of a user device, such as a STB. Alternatively, the resource management functions could be centralized in a device outside the STB, either in whole or in part. The resource manager can access a table of tuner and management information which would allow the resource manager to identify desired (user-selected) programs, determine whether or not those programs are already included in a communications channel, e.g., a QAM channel, being received and processed, e.g., at a tuner, and if not, assign a tuner which could be either local or remote, to tune the appropriate communications channel. Then, based on the request of the user to either store or immediately view the desired program (the program in the appropriate time slot of the associated program channel), the resource manager can determine the appropriate device, either local or remote, for delivery of the desired program, either by default or under the direction of the user.

Figure 4:
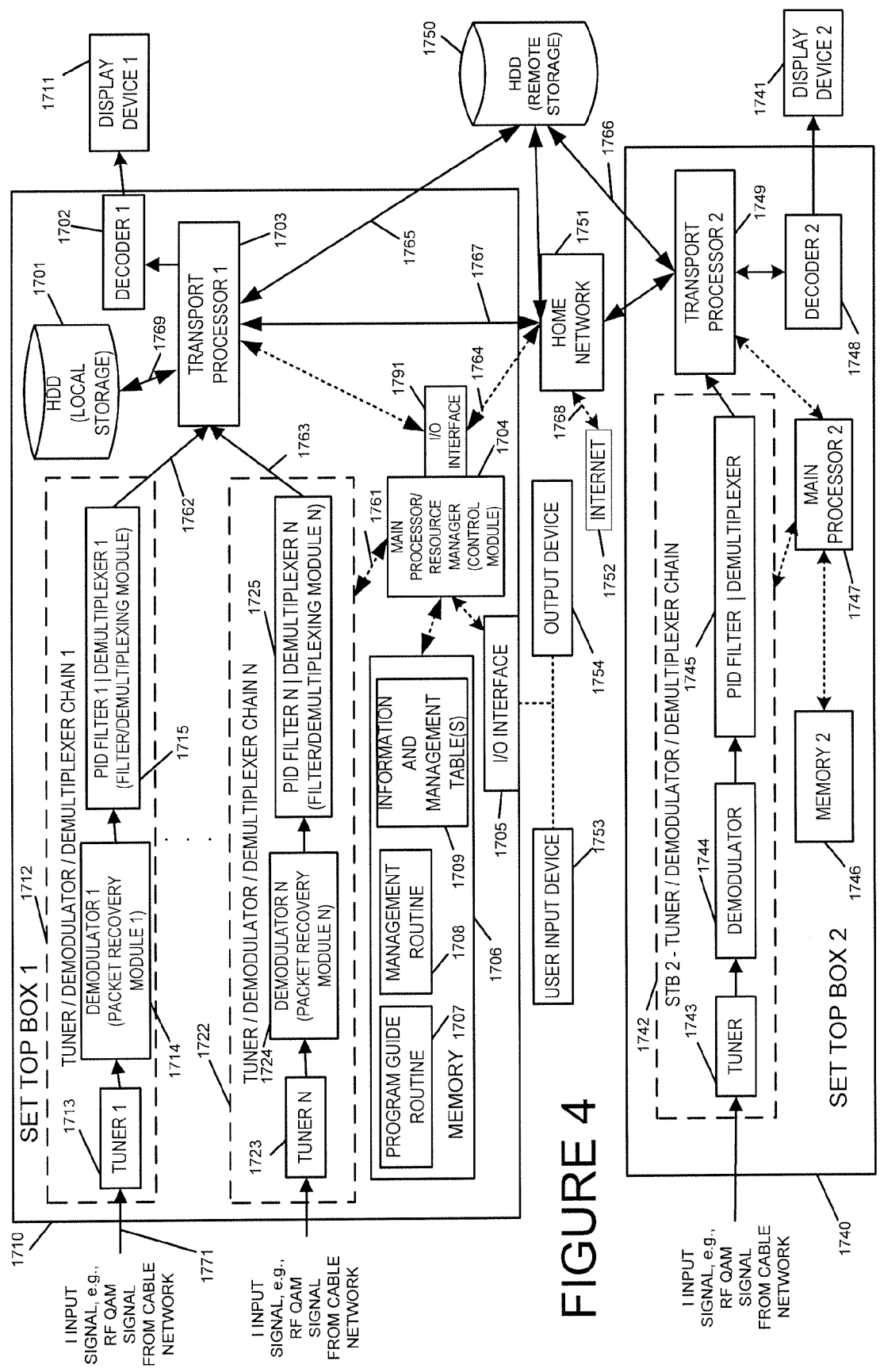
FIG. 4 illustrates an exemplary system for receiving, recording, and playback implemented in accordance with an exemplary embodiment of the present invention.

FIG. 4 is a drawing of exemplary receiving, recording, and playback system implemented in accordance with some embodiments of the present invention. Two STB's, set top box 1 1710 and set top box 2 1740 are shown, along with user input device 1753, output device 1754, home network 1751, internet access 1752, display device 1 1711, display device 2 1741, and HDD remote storage 1750.

Set top box 1 1710 includes tuner/demodulator/demultiplexer chain 1 1712 through tuner/demodulator/demultiplexer chain N 1722. Tuner/demodulator/demultiplexer chain 1 1712 includes tuner 1 1713, packet recovery module such as demodulator module 1 1714, and PID filter 1|demultiplexer 1 1715. Tuner/demodulator/demultiplexer chain N 1722 contains tuner N 1723, demodulator N 1724, and PID filter N|demultiplexer N 1725. Each chain receives an input signal, e.g., a signal including a set of RF QAM signals from the cable network corresponding to different communications channels. The tuner is tuned to one of the communications channels. The demodulator module 1714 is a packet recovery module which outputs packets which are supplied to the input of the PID filter 1/demultiplexer 1 module 1715. The filtering may precede or follow demultiplexing. The PID filter passes packets corresponding to selected program channels/programs and rejects, e.g., blocks, packets corresponding to programs and/or channels which have not been selected. Packets which have been demultiplexed and passed by the PID filter of the chains 1712, 1722 are sent to the transport processor 1 1703 over links 1762 through 1763 respectively. The chains 1712, 1725 are in communication with the transport processor via link 1761 and work under the direction of, main processor/resource manager 1704 which can communicate with other devices via interface 1791 and/or I/O interface 1705. The main processor/resource manager 1704 is a control module which can control the use of both local and remote resources, e.g., tuner/demodulator chains and/or transport processors 1703, 1749 and can communicate with the various devices of the network via direct links and/or home network 1751. Although link 1761 is depicted as connected to tuner/demodulator/demultiplexer chain N, it should be appreciated that it is connected with each of the tuner/demodulator/demultiplexer chains and may be implemented as a communications bus.

As an example of the operation of the tuner/demodulator/demultiplexer chains, tuner/demodulator/demultiplexer chain 1 1712 will be described in more detail. A typical RF signal enters set top box 1 1710 at input 1771 with multiple carriers between, e.g., frequencies 50-1000 MHz. Tuner 1 1713, under the direction of main processor/resource manager 1704, is tuned to or otherwise controlled to selects a single 6 MHz carrier frequency and passes the signal corresponding to the band to demodulator 1714 while filtering out other bands. Demodulator 1714 converts the data transmitted on the tuned carrier frequency to the digital data, e.g., by performing a demodulation, symbol recovery operation and/or packet recovery operation. In some embodiments, the output of demodulator 1714 is series of packets which correspond to a standard MPEG 2 Multi Program Transport Stream (MPTS). The MPTS enters PID filter 1|demultiplexer 1 1715. PID filter 1 is a Program Identifier (PID) filter which is able to distinguish between packets corresponding to different programs, e.g., based on program identification information which may be, for example, an identifier included within the header of packets. The PID filter allows demultiplexer 1 to locate and pass the packets corresponding to a Single Program Transport Stream (SPTS) of interest while rejecting or outputting the packets of another stream on another output. PID filter 1|demultiplexer 1 1715 allows multiple SPTS's to be selected and sent from PID filter 1|demultiplexer 1 1715 to transport processor 1 1703 over link 1762. Transport processor 1 1703 is responsible for receiving the SPTS streams and then forwarding each stream to the appropriate destination, as directed by main processor/resource manager 1704. If the packet contents were encrypted, in some embodiments the transport processor performs a decryption operation, e.g., before communicating the program stream to its destination, e.g., a video decoder. Each stream can be directed to one or more of: internal HDD (local storage) 1701, typically a hard drive, e.g., over link 1769, for storage of the stream; to local decoder 1 1702 in order to view the stream on display device 1 1711; to home network 1751 over link 1767 to access display device 2 1741, via transport processor 2 1749 and decoder 2 1748 of set top box 2 1740; and/or via link 1765 to HDD (remote storage) 1750.

The user can initiate a request for a particular program by utilizing user input device 1753. This device is connected to set top box 1 1710 via I/O interface 1705. This can be done via infrared (IR) signaling device or other type of remote control, for example. Alternatively, user input device 1753 could be incorporated into set top box 1 1710, e.g., as a keypad of a control panel. I/O device 1705 transfers the program request, which could be a particular program channel during a particular time slot, a program name, or other indication of a desired program, and could optionally include a desired device to receive the program, such as decoder/display 1702, 1711, decoder/display 2 1748, 1741, HDD (local storage) 1701, or HDD (remote storage) 1750. One alternative is for main processor/resource manager 1704 to access the Internet, via communications link 1764, home network 1751, and the Internet 1752 over link 1768, in order to correlate the user's request for a particular program name, or other indication of a requested program, with a program channel. Alternatively, the system could default to display the program on the local display device (display device 1 1711 for set top box 1 1710) unless a specific alternative destination is requested by the user.

Once main processor/resource manager 1704 receives the program request, it accesses memory 1705 to determine how to proceed. Memory 1705 includes program guide routine 1707, management routine 1708, and information and management table(s) 1709. Main processor/resource manager 1704 runs program guide routine 1707, which accesses information and management table(s) 1709 to identify the communications channel that includes the desired program, by identifying the program channel associated with the desired program, and cross-referencing the program channel makeup of each of the available communications channels. This is discussed below in more detail below in relation to FIG. 5. As should be appreciated the stored information may be stored in memory in a variety of different ways, e.g., as one or multiple information tables.

Once the program guide routine 1707 determines the program channel and time slot of the requested program, main processor/resource manager 1704, operating under control of management routine 1708 in memory 1705, determines how best to access the appropriate communications channel. For example, if the desired communications channel was already being tuned at tuner 1 1713, main processor/resource manager 1704 would instruct PID filter 1/demultiplexer 1 1715 to additionally strip off, e.g., pass, the desired program channel to send to transport processor 1 1703. If no local tuners were tuned to the desired communications channel, main processor/resource manager 1704 determines whether a remote tuner, such as tuner 1743 of set top box 2 1740 is available. The determination of available remote resources may be made by communicating with various devices via home network 1751 including transport processor 2 1749, and main processor 2 1747 and/or various remote tuners. The determination may include determining if a remote tuner is already tuned to the appropriate communications channel. The main processor/resource manager 1704 could have a direct communications link to main processor 2 1747 avoiding the need to communicate via the home network or some other indirect communications path.

If no tuners were currently tuned to the appropriate communications channel associated with the requested program, then management routine 1708 would, in various embodiments, find an available tuner by consulting information and management table(s) 1709. If no tuner was available, a message would be sent from main processor/resource manager 1704 to output device 1754, via I/O interface 1705, indicating that the requested program cannot be obtained in the requested time slot, due to insufficient resources. Output device 1754 could be a stand alone device, incorporated with user input device 1753, or consist simply of an indicator incorporated into set top box 1 1710.

Management routine 1708 utilizes information and management table(s) 1709 in order to determine the communications channel, e.g., QAM channel, including the appropriate program, and to determine the tuner which should be tuned to the appropriate communications channel.

If, for example, tuner 1743 in STB 2—tuner/demodulator/demultiplexer chain 1742 was selected to receive a particular program channel containing the desired program, it would operate in a similar fashion to the operation described above in relation to tuner/demodulator/demultiplexer chain 1 1712. Main processor/resource manager 1704 would direct main processor 2 1747 to cause tuner 1743 to filter the RF QAM input signal received at tuner 1743 to output the desired communications channel to demodulator 1744, which would output the demodulated signal to PID filter|demultiplexer 1745, which would then output the resultant program channel stream to transport processor 2 1749. This may be done under control of communications with main processor 2 1747. Transport processor 2 1749 could send the program channel to set top box 1 1710 via home network 1751, HDD (remote storage) 1750 over link 1766, or decoder 2 1748, associated with display device 2 1741. Main processor 2 1747, similar to main processor/resource manager 1704, would be in communication with memory 2 1746, which is used in the same or a similar manner as memory 1706 of set top box 1 1710.

Figure 5:
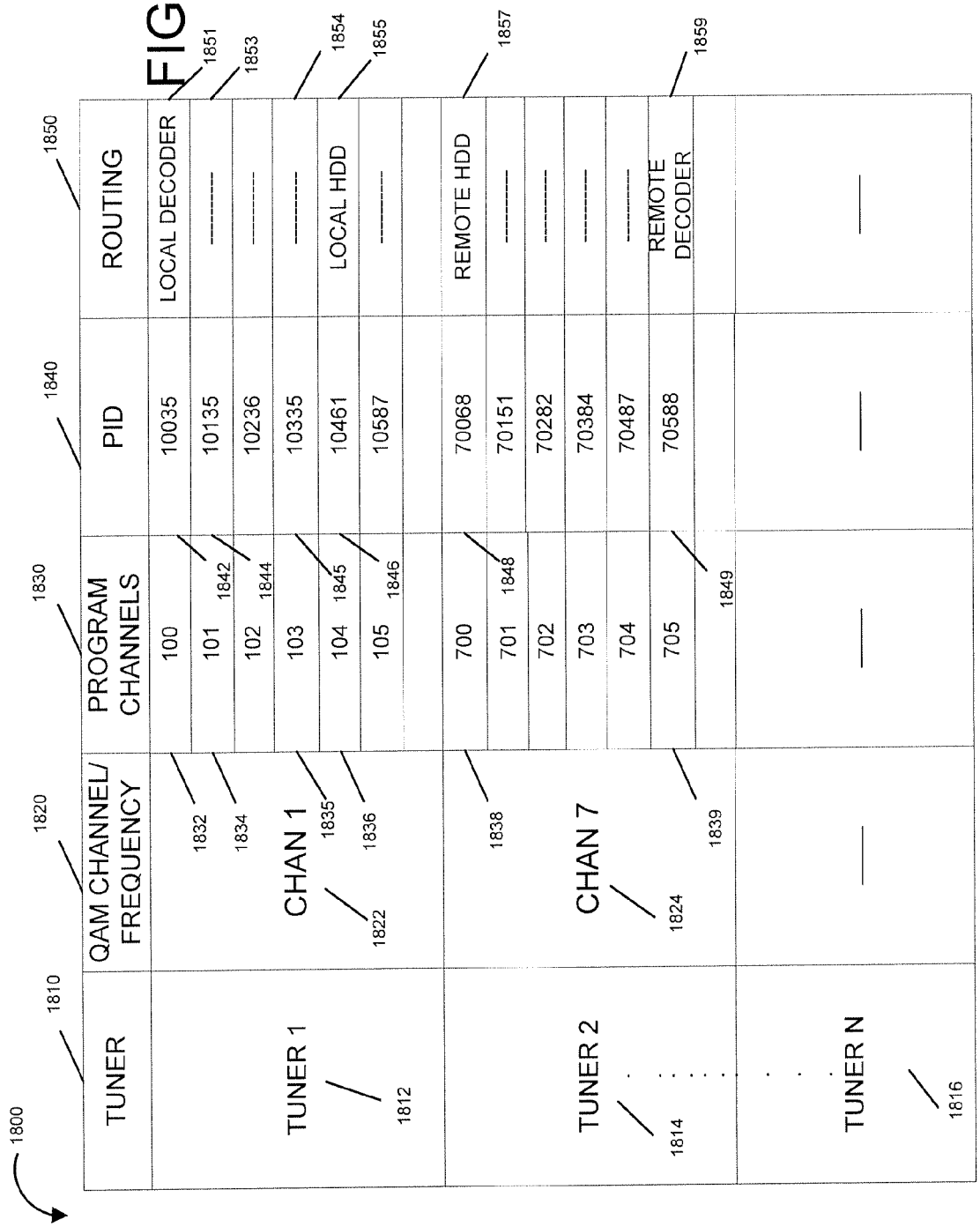
FIG. 5 illustrates a matrix of an exemplary program, tuner, routing and other information stored and used in accordance with some exemplary embodiments.

FIG. 5 illustrates an exemplary set of tuner and program management information 1800, such as would be found in information and management table(s) 1709 of FIG. 4. The information in table 1800 can be stored in and utilized by the resource manager, such as main processor/resource manager 1704 of FIG. 4. The first column 1810 lists tuners that can be controlled by the resource manager, accomplished by utilizing program guide routine 1707 of FIG. 4, e.g., in response to program display and/or recording selections made by the user. In the FIG. 5 example, N tuners may be controlled in response to user selections (tuner 1 1812, tuner 2 1814, thru tuner N 1816). The tuners may be local, e.g., within the local STB which maintains and uses the set of information shown in FIG. 4, or within a remote STB, such as in a different room of the home.

The second column 1820 indicates the communications channel, e.g., QAM channel, to which the tuner listed in column 1 1810 to the left of the channel information is tuned. The third column 1830 includes information indicating the program channels corresponding to the QAM channel to which the tuner is tuned. The fourth column 1840 includes for each program channel listed in the third column the program ID (or packet ID, program name, etc.) used to identify packets corresponding to the program channel identified in the same row as the program ID during a particular time slot. The last column 1850 includes the routing information used to control routing of packets corresponding to the program stream of the program identified by the PID included in the same row as the routing information.

The resource management module (program guide routine used in conjunction with the main processor/resource manager) controls which communications channel, and thus frequency, to which a particular tuner is set. It also updates the routing information in response to user selections, e.g., recording and/or display selections made with respect to particular programs. The routing information is used to control the filtering and forwarding of recovered packets based on the PIDs included in the packets within the communications channel data. As illustrated, based on user selections, and as described more fully above in relation to FIG. 4, program packets may be routed to a local decoder, a remote decoder and/or a recording device such as a hard disk driver as indicated by the letters "HDD". A dash is used to indicate program packets (SPTS's—Single Program Transport Streams) which should be discarded upon recovery from a transport multiplex (MPTS—Multi Program Transport Stream).

Consider, for example, the information shown for tuner 1 1812 in FIG. 5. Tuner 1 1812 is tuned to QAM channel 1 1822 which corresponds to programs channels 100, 101, 102, 103, 104, and 105 during the time slot for which information is shown in FIG. 5. The packets corresponding to the program on channel 100 1832 are identified by PID value 10035 1842 and are to be routed to a local decoder 1851, e.g., for decoding and display via local display device 1 1711 of FIG. 4. The packets corresponding to program channel 101 1834, with a PID of 10135 1844, are to be discarded as indicated by the presence of "-" 1853 in the routing information column 1850. Similarly, program channels 102, 103 and 105 of column 1830 are to be discarded. The routing information 1855 for program channel 104 1836 indicates that packets corresponding to this program channel are to be streamed to a local HDD (LHDD), for recording. This may be a hard disk drive included in the STB which maintains the set of information shown in FIG. 5 such as HDD (local storage) 1701 of FIG. 4.

The information included in FIG. 5 indicates that tuner 2 1814 is set to QAM channel 7 1824, that this communications channel provides program channels 700 through 705 and that the packets corresponding to program channel 700 1838 are to be sent to a remote hard disk driver (RHDD) 1857 for recording (such as, e.g., HDD remote storage 1750 of FIG. 4) while packets corresponding to channel 705 1839 are to be sent to a remote video decoder 1859, e.g., for decoding and playback on a display device located in another room in the house in which the STB using the table shown in FIG. 5 is located, such as display device 2 1741 of FIG. 4. It should be appreciated that in various embodiments, packets corresponding to different programs received via a single QAM channel may be sent to several different locations, e.g., the packets corresponding to a first group of one or more programs may be sent to a local recoding device, packets corresponding to a second group of one or more programs may be sent to a remote recording device, packets corresponding to another program group may be sent to a local decoding device, while packets corresponding to yet another group of one or more programs may be sent to one or more different remote decoding devices. Thus, from a single tuner which is tuned to a single communications channel, a transport multiplex of programs may be recovered and the packets corresponding to the various programs in the transport multiplex may be routed and processed differently in accordance with the invention. In this manner, multiple programs corresponding to the same program time slot may be recovered from a communications channel and processed differently, e.g., in response to user menu selections and commands.

For example, if a user requested the storage of a program with the PID of 10335, the information on FIG. 5 could be accessed to determine that this program (10335 1845) is part of QAM channel 1 1822. The main processor/resource manager, in conjunction with the program guide routine, would then determine from the information 1800 that channel 1 was currently being tuned by tuner 1 1812. The main processor/resource manager, in conjunction with the management routine, would cause the appropriate PID filter|demultiplexer associated with tuner 1 to separate out and forward packets corresponding to program channel 103 1835 (determined from information 1800), send this program to a local storage device, and change the "----" 1854 in information 1800 to "Local HDD".

In some embodiments of the present invention, the main processor/resource manager operates in conjunction with a program guide routine and a management routine, to access information and one or more management tables, to control the process of receiving a user request, determining the program channel and associated communications channel required to meet that request, and operate the appropriate tuner, demodulator, PID filter, and demultiplexer to strip off the requested program from the communications channel, and direct the resultant packets, via a transport processor, to either a decoder and associated display device, or to a storage device. The program guide and management routines could either be stand alone, or combined in the main processor/resource manager. Likewise, the information and management tables could be in a remote memory, or integrated within the main processor and/or resource manager.

Figure 6:
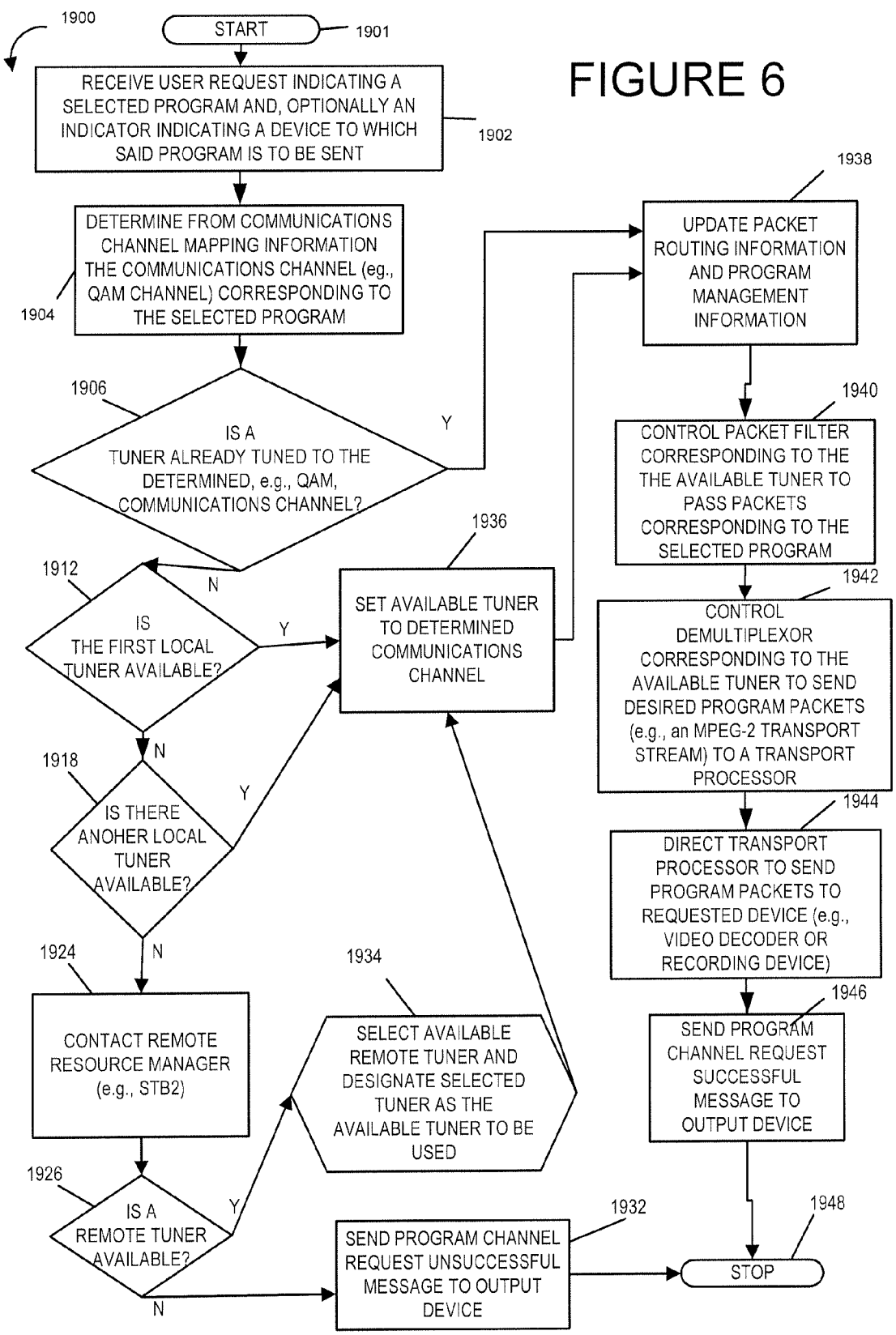
FIG. 6 is a flowchart showing exemplary steps of a method of operating a system used for receiving, recording, and playback of programs in accordance with an exemplary embodiment of the present invention.

FIG. 6 is a drawing of a flowchart 1900 of an exemplary method of operating a system of STB's, display devices, and storage devices. The processing in response to user requests proceeds each time a request is made by a user.

Operation starts in step 1901, where the various devices are powered on and initialized and monitoring for user input starts. Then in step 1902 main processor/resource manager receives a user request The request may be from, e.g., user input device 1753 of FIG. 4 and may indicate a selected program and, optionally an indicator indicating a device to which said program is to be sent.

In step 1904, the main processor/resource manager, using the program guide routine, determines from the communications channel mapping information of the information and management tables for the communications channel (e.g., QAM channel) corresponding to the selected program, e.g., the program or program channel selected by the user.

In step 1906, the main processor/resource manager determines if a tuner is already tuned to the determined, e.g., QAM, communications channel. If a tuner is already tuned to the determined communications channel, the packet routing information and program management information of the information and management tables is updated to reflect the destination of the determined program channel within the communications channel in step 1938.

If a tuner is not already tuned to the determined communications channel in step 1906, then in step 1912, the main processor/resource manager determines if the first local tuner is available to be tuned. If it is available, operation proceeds to step 1936, which sets that available tuner to the determined communications channel, and then proceeds to step 1938, wherein the packet routing information and program management information of the information and management tables is updated to reflect the tuning of the first local tuner to the determined communications channel in step 1938.

If the first local tuner is not available in step 1912, the main processor/resource manager determines if another local tuner is available in step 1918. If one is available, the operation proceeds to step 1936, wherein that available tuner is set to the determined communications channel.

If no other local tuner is available in step 1918, the main processor/resource manager contacts a remote resource manager (e.g., STB2) in step 1924. This might be a STB in another room from the first STB containing the main processor/resource manager.

In step 1926, this remote resource manager is directed to determine if a remote tuner, e.g., a tuner associated with the remote resource manager, is available. If so, in step 1934, the remote resource manager would select that available remote tuner and designate the selected tuner as the "available tuner" to be used. Operation would then proceed to step 1936, where that "available tuner" would be set to the determined communications channel, and in step 1938, the packet routing information and program management information of the information and management tables is updated to reflect the tuning of the remote tuner to the determined communications channel in step 1938. This updated information could be reflected in the local STB's information and management tables, or the remote STB's information and management tables, or in both.

If no remote tuner is available in step 1926, indicating that no tuner is available given that a local tuner was also not found to be available, the main processor/resource manager sends a "program channel request unsuccessful" message to the output device, letting the user know that his last request could not be accomplished. The process 1900 for that particular user request would then stop in step 1948. Returning to step 1938, once the appropriate packet routing information and program management information has been updated, the main processor associated with the available tuner would control the packet filter corresponding to the available tuner to pass packets (comprising the program channel) corresponding to the selected program.

In step 1942, the associated main processor would control the demultiplexer corresponding to the available tuner to send the desired program packets (e.g., an MPEG-2 transport stream) to a transport processor.

In step 1944, the associated main processor would direct the transport processor to send program packets to the requested device, e.g., video decoder or recording device. The main processor would utilize the management routine in conjunction with the information and management tables in order to control the functions of the PID filter, demultiplexer, and transport processor.

In step 1946, the associated main processor sends a "program channel request successful" message to the output device, informing the user that his request was carried out. The process regarding this user request would stop at step 1948.

With this process, a user could have a greater number of requests for programs carried out than the number of tuners available in the user's system.

In various embodiments system elements described herein are implemented using one or more modules which are used to perform the steps corresponding to one or more methods of the present invention, for example, request processing, program guide routines, management routines, content to stream assignment, content recovery, multiplexing, demultiplexing, display generation, recording of multiple programs in a QAM channel, etc. Such modules may be implemented using software, hardware or a combination of software and hardware. Each step may be performed by one or more different software instructions executed by a processor, e.g., CPU.

At least one system implemented in accordance with the present invention includes a means for implementing the various steps which are part of the methods of the present invention. Each means may be, e.g., an instruction, processor, hardware circuit and/or combination of elements used to implement a described step.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A communications system for use with a content distribution network and a home network, comprising:
   a first set top box including a local tuner;
   an input device located in a defined physical space with the first set top box including the local tuner;
   a remote tuner located in a second set top box located in a different physical space from said first set top box including said local tuner;
   a control module, located in said first set top box, for controlling use of said local tuner and remote tuner in response to user input received from said input device, said first and second set top boxes being coupled together by the home network;
   a storage unit, in said first set top box, for storing tuner and program management information including information indicating: a first communications channel to which the local tuner is tuned, a second communications channel to which the remote tuner is tuned, program identifiers of programs corresponding to said first and second communications channel, routing information corresponding to at least one of said program identifiers; and
   a packet filter for passing packets corresponding to one or more selected programs and for filtering out packets which do not correspond to selected programs.

2. The communications system of claim 1, further comprising:
   a routing device for routing packets corresponding to selected programs to devices in accordance with stored routing information included in said stored tuner and program management information.

3. The communications system of claim 2, wherein said routing device is a transport processor and wherein routing packets includes routing packets received via said first communications channel as a part of a transport multiplex to different destination devices.

4. The communications system of claim 1, wherein each of said local and remote tuners is configured to filter a signal from a communications channel supplied to a particular tuner and to pass a communications channel signal including a selected program channel; and
   a demodulator and packet recovery module coupled to a respective tuner for demodulating the communication channel signal passed by said respective tuner and recovering packets therefrom, packets generated by said demodulator and packet recovery module being supplied to said packet filter.

5. The communications device of claim 1, wherein said control module controls the routing of packets produced from signals processed by said local and remote tuners.

6. The system of claim 2,
   wherein said routing device is located in said second set top box.

7. The system of claim 6, wherein said routing information corresponding to at least one of said program identifiers stored in the storage device of said first set top box includes routing information used to control said routing device located in said second set top box.

8. The system of claim 6, wherein said home network couples said routing device included in said second set top box to said first set top box.

9. A method for use in a communications system including a content distribution network and a home network, comprising:
   operating an input device to receive user input, said input device being located in a defined physical space with a first set top box including a local tuner;
   operating a control module to control use of said local tuner and a remote tuner located in a second set top box in response to user input received from said input device, said remote tuner being located in a different physical space from said local tuner, said first and second set top boxes being coupled together by a home network;
   operating a storage unit, in said first set top box, to store tuner and program management information including information indicating: a first communications channel to which the local tuner is tuned, a second communications channel to which the remote tuner is tuned, program identifiers of programs corresponding to said first and second communications channels, routing information corresponding to at least one of said program identifiers; and
   operating a packet filter to pass packets corresponding to one or more selected programs and to filter out packets which do not correspond to selected programs.

10. The method of claim 9, further comprising:
    operating a routing device to route packets corresponding to selected programs to devices in accordance with stored routing information included in said stored tuner and program management information.

11. The method of claim 10,
    wherein said routing device is a transport processor; and
    wherein routing packets includes routing packets received via said first communications channel as a part of a transport multiplex to different destination devices.

12. The method of claim 9, further comprising:
    configuring each of said local and remote tuners to filter a signal from a communications channel supplied to a particular tuner and to pass a communications channel signal including a selected program channel; and operating a demodulator and packet recovery module coupled to a respective tuner to demodulate the communication channel signal passed by said respective tuner and recovering packets therefrom, packets generated by said demodulator and packet recovery module being supplied to said packet filter.

13. The method of claim 9, further comprising:
operating said control module to control the routing of packets produced from signals processed by said local and remote tuners.

14. The method of claim 9,
wherein said routing device is located in said second set top box.

15. The method of claim 14, wherein said routing information corresponding to at least one of said program identifiers stored in the storage device of said first set top box includes routing information used to control said routing device located in said second set top box.

16. The method of claim 15, wherein said home network couples said routing device included in said second set top box to said first set top box.

* * * * *